United States Patent
Espinoza Gonzalez et al.

(10) Patent No.: US 11,746,207 B2
(45) Date of Patent: Sep. 5, 2023

(54) METHOD FOR PRODUCING POROUS PARTICLES BY MEANS OF A HYBRID PROCESS OF ATOMISATION VIA DRYING-COOLING

(71) Applicants: CENTRO DE INVESTIGACION EN QUIMICA APLICADA, Coahuila (MX); INSTITUTO DE ECOLOGIA, A.C., Veracruz (MX)

(72) Inventors: Carlos Jose Espinoza Gonzalez, Coahuila (MX); Noe Benjamin Navarro Guajardo, Coahuila (MX); Edgar Miguel Garcia Carrillo, Coahuila (MX); Oliverio Santiago Rodriguez Fernandez, Coahuila (MX); Salvador Fernandez Tavizon, Coahuila (MX); Claudia Anahi Perez Torres, Veracruz (MX)

(73) Assignees: CENTRO DE INVESTIGACION EN QUIMICA APLICADA, Coahuila (MX); INSTITUTO DE ECOLOGIA, A.C., Veracruz (MX)

( * ) Notice: Subject to any disclaimer, the term of this patent is extended or adjusted under 35 U.S.C. 154(b) by 431 days.

(21) Appl. No.: 17/251,639

(22) PCT Filed: Jun. 14, 2018

(86) PCT No.: PCT/MX2018/000054
§ 371 (c)(1),
(2) Date: Dec. 11, 2020

(87) PCT Pub. No.: WO2019/240568
PCT Pub. Date: Dec. 19, 2019

(65) Prior Publication Data
US 2021/0253821 A1 Aug. 19, 2021

(30) Foreign Application Priority Data

Jun. 14, 2018 (MX) .................. MX/a/2018/007248

(51) Int. Cl.
*C08J 9/28* (2006.01)
*C11B 15/00* (2006.01)

(52) U.S. Cl.
CPC ....... *C08J 9/283* (2013.01); *C08J 2201/0504* (2013.01); *C08J 2391/06* (2013.01); *C11B 15/00* (2013.01)

(58) Field of Classification Search
CPC ............... C08J 9/283; C08J 2201/0504; C08J 2391/06; C11B 15/00
See application file for complete search history.

(56) References Cited

U.S. PATENT DOCUMENTS

| 5,102,983 A | 4/1992 | Kennedy |
| 5,380,473 A | 1/1995 | Bogue et al. |

(Continued)

FOREIGN PATENT DOCUMENTS

| EP | 3300724 A1 | 4/2018 |
| WO | 2010117253 A2 | 10/2010 |
| WO | 2015130631 A1 | 9/2015 |

OTHER PUBLICATIONS

Translation of JP 2010260005 A by Kanetani et al. (Year: 2010).*
(Continued)

*Primary Examiner* — K. Boyle
*Assistant Examiner* — Christina H. W. Rosebach
(74) *Attorney, Agent, or Firm* — BCF LLP

(57) ABSTRACT

The invention relates to a method for producing particles with pore structures, by means of a hybrid process of atomization via drying-cooling, from a water-in-oil-type emulsion of a composition of a non-solubilized and in melt state matrix. The production method comprises: i) forming (Continued)

a water-in-oil-type emulsion consisting of a composition of a solvent that is aqueous or soluble in water (dispersed phase) and a composition of a non-solubilized and in melt state matrix (continuous phase); ii) forming discrete particles from the emulsion via atomization, using a flow of gas at high pressure and temperature; iii) immediately removing the solvent via evaporation; and iv) subsequently cooling the formed discrete particles, resulting in porous particles that are substantially free from solvents.

24 Claims, 7 Drawing Sheets

(56) References Cited

U.S. PATENT DOCUMENTS

| | | | |
|---|---|---|---|
| 5,407,609 | A | 4/1995 | Tice et al. |
| 6,103,269 | A | 8/2000 | Wunderlich et al. |
| 2004/0042971 | A1 | 3/2004 | Truong-Le et al. |
| 2004/0062778 | A1 | 4/2004 | Shefer et al. |
| 2005/0186285 | A1 | 8/2005 | Ray et al. |
| 2008/0075777 | A1 | 3/2008 | Kennedy |
| 2009/0142401 | A1 | 6/2009 | Appel |
| 2010/0092453 | A1 | 4/2010 | Healy et al. |
| 2011/0243996 | A1 | 10/2011 | Truong-Le et al. |
| 2016/0090451 | A1 | 3/2016 | Ayambem |
| 2017/0007547 | A1 | 1/2017 | Huang et al. |
| 2017/0135920 | A1 | 5/2017 | Enomoto et al. |
| 2017/0143017 | A1 | 5/2017 | Badolato et al. |
| 2017/0258726 | A1 | 9/2017 | Cegnar et al. |

OTHER PUBLICATIONS

Translation of WO2019207245A1 by Le et al. (Year: 2019).*
Gwie, C.G. et al. Microstructures Formed by Spray Freezing of Food Fats. JAOCS, vol. 83, No. 12 (2006). (Year: 2006).*
Dellamary, L.A. et al. Hollow Porous Particles in Metered Dose Inhalers. Pharmaceutical Research, vol. 17, No. 2, 2000. (Year: 2000).*
International Search Report of PCT/MX2018/000054; A. Rua Aguete; dated Mar. 14, 2019.
English translation of WO2010117253A2 retrieved from https://patents.google.com/patent/WO2010117253A2/en?oq=wo2010117253 on Dec. 11, 2020.
Vehring, Pharmaceutical Particle Engineering via Spray Drying, Pharmaceutical Research, vol. 25, No. 5, May 2008, p. 999-1022.
Zhang et al., Review—Controlled freezing and freeze drying: a versatile route for porous and micro-/nano-structured materials, Journal of Chemical Technology and Biotechnology, Sep. 2, 2010, vol. 86, No. 2, p. 172-184.
Okuyama et al., Progress in developing spray-drying methods for the production of controlled morphology particles: From the nanometer to submicrometer size ranges, Advanced Powder Technology, Oct. 25, 2010, vol. 22, No. 1, p. 1-19.
Favaro-Trindade et al., Technological Challenges for Spray Chilling Encapsulation of Functional Food Ingredients, Food Technology and Biotechnology, Apr. 2013, vol. 51, No. 2, p. 171-182.
Scora et al., Epicuticular hydrocarbons of candelilla (*Euphorbia antisiphylitica*) from three different geographical areas, Industrial Crops and Products 4, 1995, vol. 4, p. 179-184.
Espinoza-Gonzalez et al., AGFD 87: Plant cuticular waxes as renewable encapsulating matrices for phosphate fertilizers: Morphological insights into phosphate release behavior, Certificate of attendance to ACS Spring 2018, 255th American Chemical Society National Meeting, American Chemical Society, New Orleans, US, Mar. 18-22, 2018.
Navarro-Guajardo et al., Candelilla Wax as Natural Slow-Release Matrix for Fertilizers Encapsulated by Spray Chilling, Journal of Renewable Materials, Apr. 2018, vol. 6, No. 3, p. 227-236.

* cited by examiner

METHOD FOR PRODUCING POROUS PARTICLES BY MEANS OF A HYBRID PROCESS OF ATOMISATION VIA DRYING-COOLING

TECHNICAL FIELD OF THE INVENTION

The present invention relates to a method for producing porous particles based on a matrix composition, which result from a hybrid process of atomization via drying-cooling applied to a water-in-oil-type emulsion of a composition of a matrix that is non-solubilized and in the molten state. The present invention relates to a method for producing porous particles without i) the excessive use of solvents to solubilize the matrix, and more particularly organic solvents to solubilize matrices not soluble in water; as well as ii) the use of post-processes for the removal of solvents and generation of a pore structure in the particles, which represents a reduction in energy consumption and processing times. The particles obtained with the method of the present invention have a pore structure and low density, making it desirable in applications in the food, cosmetics, medicine, agriculture, plastics, paints, and textiles industries, among others.

BACKGROUND OF THE INVENTION

Many additives and products used in the food, cosmetics, medicine, agriculture, plastics, paints, textiles industries, among others, are based on microparticles. Microparticles generally refer to fine particles with a size between about 0.1 to 150 microns; which in large quantities are often referred to as powders. In previous decades, microparticles had been seen as simple systems without sophisticated morphological characteristics. However, it has been proven that the inclusion of new morphological characteristics, such as variation in size, shape, porosity, texture, among others, could impart new properties and functionalities of great benefit for different applications in the industry. Therefore, the development of methods that provide particles with new morphological characteristics and functional properties is desirable.

One of the desirable morphological characteristics for such particles comprises the formation of a porous structure. Porosity in a material refers to the formation of voids or cavities on the inside and/or outside of the particle. This morphological characteristic allows the generation of materials with low density, high solubility and/or absorption of components, which is desirable for the development of different applications in industry and other emerging fields (R. Vehring, *Pharmaceutical Research*, Vol. 25, No. 5, p. 999-1022; Qian and Zhang, *Journal of Chemical Technology and Biotechnology*, Vol. 86, No. 2, p. 172-184; Nandiyanto and Okuyama, *Advanced Powder Technology*, Vol. 22, No. 1, p 1-19). The formation of this type of structure involves the development of methods that allow the removal of solvents present in a formulation made up of a matrix, which results in a solid material with a porous matrix.

Among the methods most used in the state of the art, there are the "single phase" and "emulsion" methods, in which the matrix is in solubilized form. It is known that the "single phase" method comprises the preparation of a solution or dispersion where the matrix is solubilized in a solvent or solvent mixture; while the "emulsion" method consists of the formation of an emulsion that comprises: i) a solution of a matrix solubilized in a first solvent, which forms the continuous phase of the emulsion, and ii) a second solvent which is immiscible with the first solvent and which forms the dispersed phase of the emulsion.

Subsequently, the solvent contained in these solutions and emulsions is removed by drying processes that involve the prior formation of discrete particles. In the context of the present invention, discrete particles refer to particles, droplets or fibers, which result from the application of disruptive shear forces on the solution or emulsion. In this context, drying processes that involve the prior formation of discrete particles, through an atomization process, are mostly used due to the advantages they present in terms of lower energy consumption and processing time, compared to conventional methods of mass drying as lyophilization (freeze-drying) (Qian and Zhang, *Journal of Chemical Technology and Biotechnology*, 2011, Vol. 86, No. 2, p. 172-184; Nandiyanto and Okuyama, Advanced Powder Technology, 2011, Vol. 22, No. 1, p. 1-19; U.S. Pat. No. 6,103,269) and solvent extraction (see for example U.S. Pat. No. 5,407,609).

Within the drying processes that involve the prior formation of discrete particles by means of atomization, are the atomization drying (also known as: spray drying) and the drying by atomization and freezing (also known: spray freeze-drying). These processes are used to obtain porous particles from "single phase" and "emulsion" systems, in which the matrix is in solubilized form.

It is known that the drying by atomization process is characterized by the fact that an amount of energy or heat is transferred to the discrete particles formed (that is, they absorb heat), allowing the removal of the solvent by evaporation (Anandharamakrishnan, C. (Ed)., *Handbook of Drying for Dairy Products*, 2017, p. 57-74, John Wiley & Sons). For example, U.S. patent application No. 2010/0092453 describes a process for obtaining porous microparticles with different pore characteristics, from a "single phase" system, mainly consisting of an organic matrix composition solubilized in a mixture of volatile solvents (aqueous and/or organic); which is subjected to a drying by atomization process, obtaining porous microparticles substantially free of solvents. Through said patent application, porous microparticles with different morphological pore characteristics can be obtained depending on the composition of the mixture of volatile solvents used.

On the other hand, in the process of drying by atomization and freezing, an amount of energy or heat is removed from the discrete particles formed, allowing the freezing of the solvent and its subsequent removal by methods that include sublimation (Anandharamakrishnan, C. (Ed)., *Handbook of Drying for Dairy Products*, 2017, p. 123-132, John Wiley & Sons). For example, U.S. patent applications No. 2004/0042971 and No. 2011/0243996 describe a process for obtaining porous microparticles with different pore characteristics, from aqueous formulations made of a solubilized organic matrix and bioactive ingredients. The atomization of the aqueous formulations generates discrete particles, which are frozen by immersion in a cryogenic fluid or refrigerant (liquid nitrogen, cold organic solvent, among others). Subsequently, the frozen particles are subjected to post-processes to remove the solvent, such as lyophilization and fluidized bed, obtaining microparticles with pore morphology. U.S. Pat. No. 5,102,983 and U.S. patent application No 2017/0258726 describe similar processes for the formation of microparticles with porous structure. On the other hand, the U.S. patent application No. 2008/0075777 describes a process to obtain porous microparticles with different pore characteristics, from formulations in solution, dispersion and/or emulsion form that comprise a solubilized organic matrix (in an aqueous and/or organic solvent) and active ingredients. The atomization of the aqueous formulations generates discrete particles, which are frozen when they come into direct contact with cold gas or a cryogenic fluid, which is contained in a reservoir for the microparticles. Subsequently, the frozen particles are subjected to post-processes to remove the solvent, such as immersion in an anti-solvent medium to generate pore morphology, where said medium can be contained within the same reservoir.

The apparatus developed in U.S. patent application No. 2008/0075777 allows hot gas to circulate in the vicinity of the atomization tip, with the sole purpose of avoiding freezing of discrete particles on the atomization tip, which can obstruct the continuous atomization process. The circulation of hot gas in the vicinity of the atomization tip allows generating a gradual thermal transition zone between the atomization tip and the cold gas coming from the reservoir, which allows the partial evaporation of the solvent contained in the discrete particles.

On the other hand, the U.S. patent application No. 2009/0142401 describes a process for obtaining porous microparticles from aqueous formulations made up of a matrix (referring to sugar alcohols or polyols) solubilized in water. In said patent application, the inventors mention that during the atomization of a formulation of sugar alcohols or polyols, solubilized in water at high temperature, part of the water can be evaporated due to the thermal shock between the hot discrete particles with the cold gas, allowing the obtaining frozen microparticles with pore structure. Subsequently, the frozen particles are subjected to post-processes to remove the residual solvent.

However, obtaining porous microparticles from solubilized matrices, by means of the atomization drying processes described above, still have disadvantages in terms of: i) use of solvents to solubilize the matrix, and more particularly organic solvents to solubilize matrices not soluble in water; ii) the requirement of post-processes for the total removal of solvents, which leads to iii) high energy consumption and long processing times.

In the state of the art, there is the process of spraying by cooling (also known as: spray chilling, spray cooling or spray congealing), by means of which solid microparticles are obtained from formulations of matrices not solubilized in melt state (Okuro et al., *Food Technology and Biotechnology,* 2013, Vol. 51, No. 2, p. 171-182). In this process, the matrix is in the melt state under a fluidity condition, that is, in the absence of solvents that can solubilize it, which allows the formation of discrete particles that result from the application of disruptive shear forces through an atomization process. The process of spraying by cooling is characterized in that an amount of energy or heat is removed from the discrete particle formed, generating a solidification of the particle below its melting point or fluidity condition.

In the state of the art, there are some processes of spraying by cooling to obtain solid microparticles, from dispersions and compositions containing small amounts of water, made up of a matrix not solubilized in the melt state. For example, U.S. patent application No. 2017/0143017 describes a process of spraying by cooling to obtain solid microparticles made up of between 55 to 75% by weight of a wax or fat matrix and other active ingredients dispersed in the matrix. In this process, the wax or fat matrix is previously heated above its melting point (between 40 to 85° C.) to reach a melt state. Afterwards, the active ingredients are added to the wax or fat matrix to obtain a dispersion. The mixture obtained in melt state is subsequently atomized into a chamber, where the discrete particles formed come into direct contact with a flow of gas cold enough to cool and solidify said particles, obtaining solid microparticles with a diameter of between 50 to 1000 microns. Said patent application describes that during the atomization process, solid particles can accumulate on the atomization tip, due to the rapid cooling of the discrete particles when they come into contact with cold air, which can obstruct the continuous atomization process. To avoid this, in this process a small stream of hot air is introduced from the upper part of the atomization chamber, which generates a smooth thermal transition zone between the atomization zone and the cooling zone. On the other hand, in said patent application, it is also mentioned that the microparticles obtained may contain some additives or auxiliary agents to improve the physical stability, storage and visual perception of the microparticles, which may be present between 0 to 5% by total weight of the microparticle. However, the process described in said patent application does not reveal or suggest processes, formulation parameters or operating conditions for obtaining microparticles with pore structure from non-solubilized matrices.

On the other hand, the U.S. patent application No. 2005/0186285 describes a process for obtaining solid microparticles by means of a process of spraying by cooling, from a dispersion of pharmaceutical components, solubilizing and mobility agents, in a carrier matrix in melt state. In said patent application, the mixture in the melt state is atomized using a rotating disk atomizer, where the discrete particles formed come into direct contact with a flow of gas cold enough to cool and solidify said particles, obtaining solid microparticles. Subsequently, the solid microparticles obtained are subjected to a post-heat treatment process, in order to induce changes in the crystallinity, porosity and morphology of the particle, by action of the mobility agents previously incorporated in the formulation, such as water, alcohols and other solvents in which the matrix is not soluble. Said patent application describes process conditions that allow the mobility agents to be retained in the composition of the microparticle after the process of atomization and dust collection, which allow the subsequent morphological modification of the microparticles. That is, the feed stream is at a temperature high enough to maintain the condition of melt state or fluidity and prevent loss of solvent, due to the removal of heat from the discrete particles formed by the action of the stream of air from cooling. From the process of spraying by cooling, it is known that due to the thermal shock between the hot discrete particles with the cooling gas, evaporation of the solvent present in said particles can occur due to the removal of heat; however, it has been shown that this process does not have significant effects on the morphology of the microparticle obtained, when the water content is less than 10% by weight of water (Okuro et al., *Food Technology and Biotechnology,* 2013, *Vol* 51, No. 2, p. 171-182; I. Ghebre-Sellassie et al., *Encyclopedia of Pharmaceutical Technology,* 2006, Vol. 11, p. 369-394). Similarly, the process described in U.S. patent application No. 2005/0186285 does not reveal or suggest processes, formulation parameters or operating conditions that allow the obtaining of microparticles with pore structure from non-solubilized matrices, which can be obtained during the atomization process itself, without the need for employ post-heat treatment processes for solvent removal.

On the other hand, from the process of spraying by cooling, it is known that changes in the morphology of the particles obtained, in terms of particle size, can be controlled as a function of the formulation parameters of the matrix and the operation of the process (Okuro et al., *Food Technology and Biotechnology,* 2013, Vol. 51, No. 2, 171-182). Within the operating parameters, these include the configuration of the atomization system (rotating disk, pneumatic atomization, ultrasonic atomization, among others) and the operating conditions of said system. Beyond changes in particle size, mostly associated with operating conditions, it is found that the selection of atomization systems has been based on the viability of said systems to facilitate the processing of the matrix or formulation in the molten state.

In this sense, U.S. Pat. No. 5,380,473 describes a process of spraying by cooling for obtaining solid microparticles from a matrix formulation in melt state, using a pneumatic atomization system. In such a process, a matrix formulation based on sucrose and maltodextrin is subjected to heating until reaching a melt state or flow condition. Subsequently, the formulation in melt state is subjected to a pneumatic atomization process, in which the feed flow in melt state is subjected to disruptive or shear forces, by the action of an air stream at high pressure and temperature (160-200° C. for sucrose, and 85-180° C. for maltodextrin), generating discrete particles that are cooled and solidified immediately after being formed when they come into contact with a stream of cold air. The process described in U.S. Pat. No. 5,380,473 is characterized by using a pneumatic atomization system with an operating condition of air at high pressure and temperature, which allows to improve the processability of the feed flow in melt state compared to atomization systems such as the rotating disk, which is mostly used, and where the disruptive force applied on the feed stream is only the centrifugal force. In addition, U.S. Pat. No. 5,380,473 describes that the melt matrix formulation may contain a small amount of water as a solvent (less than 5% by total weight of the feedstock), with the sole purpose of further improving the processability of the feed stream in melt state. In said patent, the water content in the feed stream formulation is limited to a minimum amount, as a condition to preserve the nature of the matrix not solubilized or in melt state, since the matrices used in said patent are highly soluble matrices in water. Similarly, the patent described above does not reveal or suggest processes, formulation parameters or operating conditions which allow the obtaining of microparticles with pore structure, from non-solubilized matrices and in melt state, which can be obtained during the atomization process.

Due to the technical characteristics of the process of spraying by cooling, the patents and scientific literature described above demonstrate that the microparticles obtained by this process are characterized by having a non-porous solid morphology, spherical in shape and with a smooth surface (Okuro et al., *Food Technology and Biotechnology*, 2013, Vol. 51, No. 2, p. 171-182; N. Navarro-Guajardo et al., *Journal of Renewable Materials*, 2018, Vol. 6, No. 3, p. 227-236; I. Ghebre-Sellassie et al., *Encyclopedia of Pharmaceutical Technology*, 2006, Vol. 11, p. 369-394); which represents a limitation for obtaining microparticles with pore structure through this process.

The state of the art described above shows the need to develop atomization processes to obtain particles with pore structure from formulations of non-solubilized matrices in melt state, which provide ease of processing and do not require processes of post-treatment to obtain said particles. The object of the present invention is to provide a method for obtaining particles with pore structure, from formulations of non-solubilized matrices and in melt state, by means of a pneumatic atomization process.

BRIEF DESCRIPTION OF THE DRAWINGS

The novel aspects that are considered characteristic of the present invention will be set forth with particularity in the appended claims. However, the invention itself, both because of its structure and its performance, together with other objects and advantages thereof, will be better understood in the following detailed description, when read in connection with the accompanying figures, as appropriate:

FIG. 1a is an SEM image of the pore structure at the surface level. FIG. 1b is a SEM image of the structure inside the particle.

FIG. 2a is a SEM image of the pore structure at the surface level. FIG. 2b is an SEM image of the pore structure within the particle.

FIG. 3a is an SEM image of the surface level pore structure. FIG. 3b is an SEM image of the pore structure within the particle.

FIG. 5a is a SEM image of the pore structure at the surface level. FIG. 5b is an SEM image of the pore structure within the particle.

FIG. 6a is a SEM image of the surface level pore structure. FIG. 6b is an SEM image of the pore structure within the particle.

FIG. 7a is an SEM image of the surface level pore structure. FIG. 7b is an SEM image of the pore structure within the particle.

DETAILED DESCRIPTION OF THE INVENTION

Figure 1:
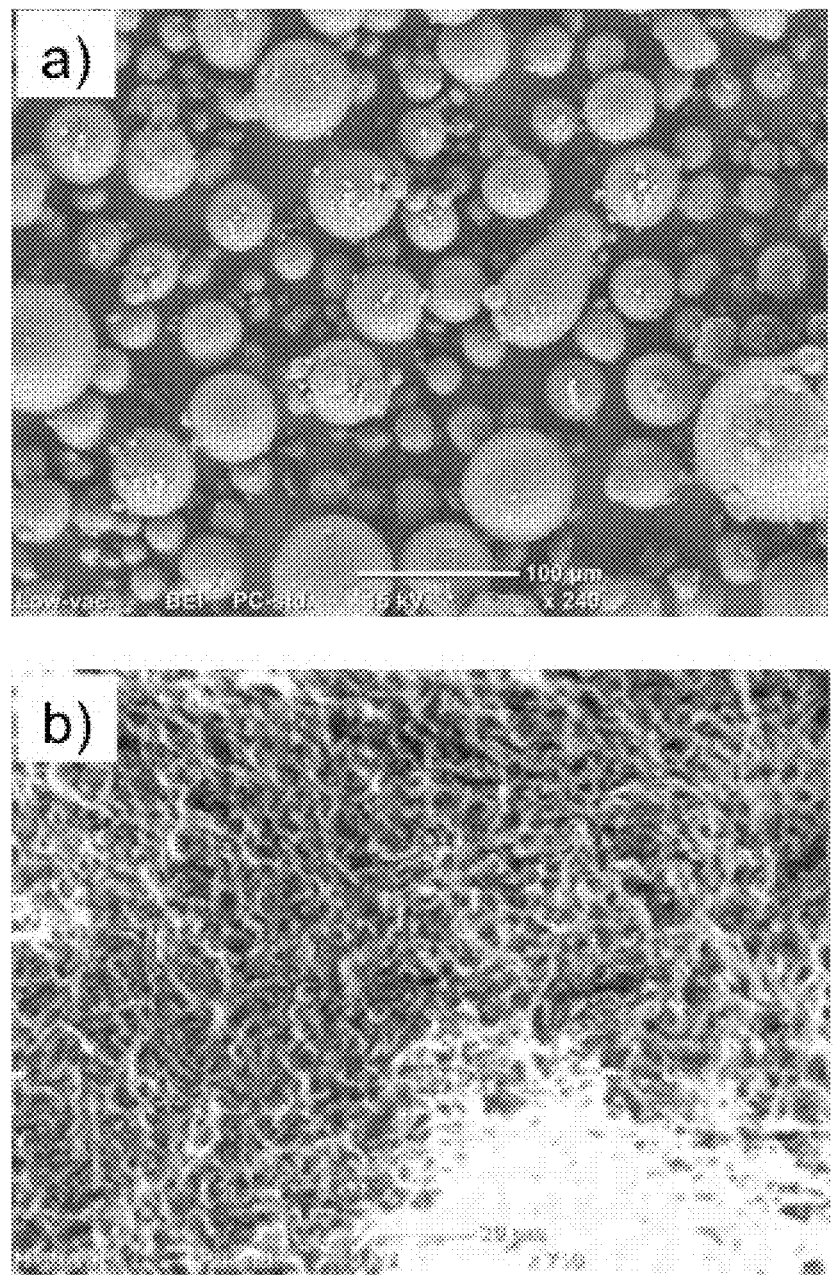
FIG. 1 illustrates scanning electron microscopy (SEM) images of solid particles obtained from a candelilla wax matrix composition with a water content of 2% by weight.

In order to solve the needs identified in the prior art, the inventors have developed a method for obtaining particles with a pore structure through a hybrid process of atomization of water-in-oil type emulsions, made up of non-solubilized and in melt state matrices. Unlike the prior art, the present invention describes a hybrid process that combines the technical characteristics that differentiate the process of drying by atomization and spraying by cooling to obtain particles with pore structure, without the need to: i) resort to the excessive use of solvents to solubilize the matrix, and more particularly organic solvents to solubilize non-water soluble matrices; as well as ii) the use of post-processes for the removal of solvents and generation of pore structure in the particles, which allows a reduction in energy consumption and processing times.

The term "particle" is referred to in the present invention as a discrete quantity of matter (solid, liquid or in melt state), which has an interface with the environment that surrounds it. The nano- and micro-prefixes are used in the present invention only to describe the size of the particles obtained, therefore they do not limit or exclude other prefixes that could be used to describe the particle size. For example, the term "nanoparticles" are generally referred to particles with an average diameter less than 0.1 microns, while the term "microparticles" refers to particles with an average diameter greater than or equal to 0.1 microns. Preferably, the particles obtained in the present invention have an average diameter of 0.1 microns to 150 microns, and more preferably 1 micron to 80 microns.

The term "pore structure" refers in the present invention to particles that have a formation of voids or cavities in the interior and/or exterior of the particle. The voids or cavities in the particle can have a defined geometric shape (circular, cylindrical, etc.) or irregular, in addition to being able to be classified depending on the accessibility to the environment that surrounds it. The voids or cavities communicating with the external surface of the particle are referred to "particles with an open pore structure", while the voids or cavities without communication with the external surface of the particle are referred to "particles with a closed pore structure". Preferably, the particles obtained in the present invention have a combination of open and closed pore structures.

The term "hybrid process" is referred to in the present invention as a single process that combines the technical principles that define or characterize separately the drying by atomization and spraying by cooling processes, to obtain microparticles with pore structure, from of formulations consisting of non-solubilized matrices and in the molten state, which could not be obtained using both processes separately.

The term "non solubilized" refers in the present invention, to the fact that the matrices used are not within a dissolution condition (dissolved or solubilized) in the presence of an aqueous and/or water-soluble solvent, which forms the water-in-oil type emulsion system.

Generally, the term "melt" refers to the transition of a crystalline matrix from a crystalline state to a liquid state, which occurs at its melting point ($T_m$). However, the term "melt" should be understood in a broader way. In the present invention, the term "melt state" refers to the matrix composition being heated sufficiently to reach a condition of flow, which allows it to be stirred, mixed, transported, pumped or atomized in a manner similar to a matrix solubilized or in liquid state.

The present invention provides a method for obtaining particles with a pore structure, by means of a hybrid process of atomization via drying-cooling, which comprises the general steps of:
 a) providing a water-in-oil type emulsion, made up of a non-solubilized matrix in melt state, and an aqueous and/or water-soluble solvent;
 b) atomizing the emulsion obtained in step a), through the action of shear forces induced by a flow of atomization gas at high pressure and temperature; and
 c) cooling the discrete particles obtained in step b), immediately after having removed the solvent composition, obtaining discrete particles in a solid state, essentially free of solvents and with a pore structure.

The technical aspects that define and make the present invention unique are described in detail when addressing each of the general steps of the present invention, in the same order in which they were presented.

1. Providing a water-in-oil type emulsion, which comprises:
 i. a composition of a non-solubilized matrix and in melt state, made up of at least one wax and/or fat, wherein said matrix composition constitutes the continuous phase of the emulsion; and
 ii. an aqueous and/or water-soluble solvent composition, which optionally may contain a volatile non-aqueous solvent, wherein said composition constitutes the dispersed phase of the emulsion.

In relation to this step, it is described that, in order to provide a "water-in-oil" type emulsion, it is preferred that the percentage by weight of the composition of aqueous and/or water-soluble solvents is from 60% to 10%, and more preferably 50% to 10%, to maintain the aqueous and/or water soluble solvent composition as the dispersed phase of the emulsion, and thus have the desired effect on the pore structure.

The water-in-oil type emulsion can be prepared using processes that are known in the state of the art. Examples of these processes include but are not limited to: mixing processes such as the use of magnetic stirring, a homogenizer, a sonicator or extrusion mixing processes, such as ultrasonic assisted extrusion or static mixers (see international patent application WO2010/117253A2); as well as low energy processes and/or combinations thereof. Preferably, the emulsions need to be formed under process conditions in which both phases (dispersed phase and continuous phase) are stable, in order to avoid or reduce the risk of phase separation that may limit the object of this invention.

In a preferred embodiment of the invention, the water-in-oil type emulsion is formed from a composition of a matrix in melt state, which is obtained when said matrix composition is heated sufficiently to reach a condition of flow. The matrix composition in melt state (continuous phase) is kept under stirring, preferably using elements of intensive stirring; to later add an aqueous or water-soluble solvent composition (dispersed phase), using a feed flow control element, in order to obtain a water-in-oil type emulsion of a non-solubilized and in melt state matrix composition.

The composition of the matrix, as the continuous phase of the emulsion, comprises from 40% to 90% by weight of the total emulsion, and more preferably from 50% to 90% by weight of the total emulsion.

In the present invention, the continuous phase of the emulsion refers to a matrix composition, which comprises at least one matrix selected from the group consisting of waxes and/or fats; wherein said matrix composition may also contain other matrices selected from the group consisting of thermoplastic polymers, biodegradable polymers, biopolymers and elastomers.

The matrices are selected from these groups, in such a way that said matrix composition is capable of reaching the condition of a non-solubilized and in melt state matrix in a water-in-oil type emulsion system. Examples of matrices useful for this invention include but are not limited to natural and/or synthetic waxes, such as candelilla wax, carnauba wax, paraffin wax, beeswax; fats, such as stearic acid, palmitic acid; thermoplastic polymers, such as polyolefins, polyamides, polyesters, polyacrylates, polystyrenes; biodegradable polymers, such as polyvinyl acetate, polylactic acid; biopolymers, such as polysaccharides, biopolyesters, polyglutamic acid, and combinations thereof.

In the present invention, fats refer to a broad group of low molecular weight compounds that are generally soluble in organic solvents and highly insoluble in water. Among the best known fatty compounds are the triesters of glycerol and fatty acids. Fatty acids are chains of carbon and hydrogen atoms with a carboxylic acid functional group at the end of the chain. Fats can be of synthetic or natural origin. In the present invention, waxes refer to organic compounds that characteristically consist of long alkyl chain compounds. Waxes can be of natural or synthetic origin, and generally have crystalline characteristics.

For example, naturally occurring waxes (derived from plants and animals) are typically made up of long chain alkyl compounds with functional groups, such as fatty acids, fatty acid ester compounds, and long chain alcohols; while synthetic waxes are typically made up of long alkyl chain compounds without functional groups, such as alkanes or paraffins. The waxes and/or fats used in the present invention include but are not limited to waxes containing fully saturated (fully hydrogenated), partially saturated (partially hydrogenated), unsaturated (non-hydrogenated) long alkyl chain compounds, derivatives and/or combinations thereof.

In a preferred embodiment of the invention, the matrix composition comprises at least one matrix selected from the group comprising waxes containing fatty acids in their composition. Within this group, there are some natural waxes, which may contain fatty acids in their composition depending on their origin. Examples of natural waxes, which are useful for the present invention, include but are not limited to carnauba wax, candelilla wax, beeswax, sugar cane wax and/or mixtures of these. For example, candelilla and carnauba waxes contain fatty acids in their composition. Preferably, the matrix composition comprising waxes containing fatty acids in their composition constitute from 50% to 90% by weight of the total emulsion.

In an even more preferred embodiment of the invention, said matrix composition comprises candelilla wax. Candelilla wax is known to consist of long chain alkyl compounds such as long chain alkanes (C29-C33), free fatty acids, fatty acid esters, hydroxylated esters, diesters; and to a lesser amount low molecular weight biopolymers such as polyesters and polyhydroxy fatty acids (G. A. Scora et al., *Industrial Crops and Products*, 1995, Vol. 4, p. 179-184). Candelilla wax can have a melting point in the temperature range between 69° C. to 73° C.

In another more preferred embodiment of the invention, said matrix composition comprises carnauba wax. Carnauba wax is also made up of long chain alkyl compounds, free fatty acids, fatty acid esters, alcohols; as well as small amounts of low molecular weight biopolymers such as polyesters and polyhydroxy fatty acids, although in a different ratio than candelilla wax. Due to this variation in the composition ratio, carnauba wax can have a melting point in the temperature range between 83° C. to 86° C.

In the context of the present invention, the melting point of a wax and/or fat is mostly referred to a range rather than a point value, since most waxes and/or fats are made up of a mixture of components of different chemical composition and alkyl chain length. In general, waxes and/or fats have a melting point ($T_m$) in a range of 40° C. to 90° C., which can be determined by standard measurement norms such as ASTM D4419, using the technique of Differential Scanning calorimetry—known by its acronym as DSC. Preferably, the matrix composition comprising waxes and/or fats is heated to a temperature of at least 1° C. above its melting point or flow condition ($T_m$+1° C.).

In the case of composition of matrices, which contain matrices that comprise thermoplastic polymers, biodegradable polymers, biopolymers and elastomers; these matrices can have a melting point or flow condition in a temperature range higher than that presented by waxes and/or fats, depending on the molecular weight of said polymer matrix. That is, high molecular weight polymers exhibit a melting point or flow condition in a higher temperature range than low molecular weight polymers. The determination of the melting point can be carried out according to standard norms.

In the context of the present invention, when the matrix composition comprises a mixture between a wax and/or fat matrix and a polymer matrix; the presence of at least one matrix of wax and/or fat with a melting point of 40° C. to 90° C., allows reaching in this temperature range, a condition of sufficient fluidity so that the emulsion obtained can be stirred, mixed, transported, pumped or atomized in a manner similar to a solubilized matrix or in a liquid state. Therefore, when the matrix composition is made up mostly of a polymer matrix, the selection of the wax and/or fat matrix must be done in such a way as to have a stable continuous phase.

The water-in-oil type emulsion composition comprises an aqueous and/or water-soluble solvent composition, as the dispersed phase. In the present invention, the aqueous and/or water-soluble solvent is referred to polar or "water-like" solvents, which can be protic and aprotic polar solvents. Preferably, the solvent should have a boiling point of less than 150° C. Examples of polar solvents that can be used in this invention include but are not limited to water; alcohols such as methanol, ethanol, isomers of propanol; ketones, such as methyl ethyl ketone; chlorocarbons, such as chloroform; nitro compounds, such as N, N-dimethylformamide, ammonia, diethylamine; carboxylic acids, such as acetic acid; and combinations thereof. The type of solvent used as the dispersed phase will affect the porosity of the particles obtained. In the case where the dispersed phase comprises a mixture of water-soluble solvents, the particles prepared from a mixture of solvents such as water-ethanol will generate higher porosity than the particles prepared from a water-chloroform mixture. This is due to the greater solubility of ethanol in water than chloroform in water. In the most preferred embodiment of the invention, the polar solvent selected to form the dispersed phase is water, and is present in a composition of 50% to 10% by weight of the total emulsion.

Optionally, the dispersed phase of the emulsion, made up of an aqueous and/or water-soluble solvent, can contain a non-polar volatile solvent, thus forming an oil-in-water type emulsion. In the present invention, volatile non-polar solvent is generally referred to as water insoluble organic solvents. Preferably, the non-polar solvent should have a boiling point of less than 150° C., and can be selected from a wide variety of common organic solvents. Examples of volatile non-polar solvents that can be used in this invention include but are not limited to: hydrocarbons, such as pentane, hexane, heptane, cyclohexane, octane; ethers, such as dibutyl ether; and combinations thereof.

The dispersed phase of the emulsion can be constituted by one or more solvents, in which the matrix composition is soluble. However, the presence of these solvents are provided to, as the case may be, 1) improve the processability of the emulsion, and/or 2) induce specific changes in the morphology and pore structure of the particle. Therefore, the presence of such solvents is not intended to be used to change the nature of the matrix to a dissolved or solubilized condition.

Preferably, the emulsions need to be formed under process conditions in which both phases (dispersed phase and continuous phase) are stable. A person skilled in the art will understand that phase stabilization in an emulsion is generally achieved with the inclusion of stabilizing agents such as surfactants. Surfactants are compounds that reduce the surface tension between two phases that are generally insoluble in each other, generating a stable emulsion. Thus, optionally, the dispersed and/or continuous phase of the emulsion may include one or more surfactants. Surfactants useful for the present invention should preferably have a solid state at temperatures below 40° C. Preferably, the selected surfactant should be soluble in the continuous phase of the emulsion. Surfactants can be selected from the group consisting of non-ionic, anionic, cationic, amphoteric surfactants, and combinations thereof. Examples of non-ionic surfactants useful for the present invention include but are not limited to sorbitan esters; polysorbates; alkyl polyglycosides; ethoxylated fatty alcohols; ethoxylated fatty acids; ethoxylated fatty amine; ethylene oxide block copolymers and propylene oxides; and combinations thereof.

Examples of anionic surfactants useful for the present invention include but are not limited to alkyl carboxylates; carboxylic acid esters; alkyl sulfates; alkyl ether sulfates; alkylbenzenesulfonates; alkyl phosphates; alkylsulfonates; and combinations thereof.

Examples of cationic surfactants useful for the present invention include but are not limited to fatty amine salts, quaternary ammonium compounds, phosphonium salts; sulfonium salts; alkyl amido betaines; and combinations thereof.

In a preferred embodiment of the invention, the surfactants are selected from the group comprising anionic surfactants (preferably alkyl phosphates, such as L-α-phosphatidylcholine).

Preferably, the surfactants are present in the water-in-oil type emulsion, in a concentration lower than the content of the matrix composition (continuous phase), which can be in a concentration from 0.001% to 20% by weight of the total of the composition of the matrix, preferably from 0.001% to 10% by weight of the total composition of the matrix, and more preferably from 0.001% to 5% by weight of the total composition of the matrix.

In a preferred embodiment of the invention, the water-in-oil type emulsion comprises a natural wax composition as the continuous phase, and water as the dispersed phase of said emulsion; where the dispersed phase is from 50% to 10% by weight, obtaining a stable emulsion without the need for the use of surfactants. Without being bound by any particular mechanism or theory, it is believed that the polar components present in natural waxes, such as fatty acid esters, hydroxylated esters, and long chain alcohols, act as natural surfactants, stabilizing the aqueous phase of the emulsion. Since the ratio of polar and non-polar components depends on the type of natural wax selected, it is thought that water-in-oil type emulsions can be obtained with different morphological characteristics of the dispersed phase (shape, size), which give rise to obtain particles with different pore structure.

Continuing with the description of the general steps of the method of the present invention, the following step should be followed:

2. Atomizing the emulsion obtained in step a), through the action of shear forces induced by a flow of atomization gas, which must be provided at a pressure and temperature high enough to develop the steps that comprise:
   i. separating the water-in-oil type emulsion obtained in step a) into discrete particles; and;
   ii. removing the solvent composition described in step a) by evaporation, allowing the formation of a pore structure.

In this step, once the water-in-oil type emulsion is formed, it can be: 1) conserved in melt state in a tank or reservoir, to later be transferred to an atomizer; or 2) be immediately transferred to an atomizer, which separates the emulsion into discrete particles. Practically any conveying method known in the art can be used to effect transfer of the feed material (water-in-oil type emulsion) to the atomizer. Examples of these processes can include the use of injection pumps or fluid transport equipment such as extruders, pistons, among others. Preferably, the emulsion should be kept at a temperature higher than 40° C., while the transfer process to the atomizer is carried out, in order to maintain the emulsion in a desired fluidity condition.

One of the defining characteristics of the present invention is that the water-in-oil type emulsion atomization process is developed through pneumatic atomization or atomization of two fluids (that is, air and feed material). In this atomization process, the feed material (water-in-oil type emulsion) is subjected to the action of shear stresses induced by a high pressure atomization gas flow, which causes the separation of the emulsion into discrete particles.

More preferably, one of the characteristics that define the present invention is that in the atomization process, the atomization gas flow is also at a temperature high enough to: 1) be able to separate the emulsion without the non-solubilized and in melt state matrix (continuous phase of the emulsion) loses its fluidity condition at the moment of forming the discrete particles; the above, as a physical condition that allows 2) the immediate removal of the solvent (dispersed phase of the emulsion) by evaporation, even from inside the discrete particle formed, allowing the formation of discrete particles with an open and/or closed pore structure.

Without being bound to a particular mechanism or theory, it is believed that the solvent composition found within the particle is removed through "channels" or "pathways" formed, preferably, by polar compounds that comprise the matrix. The solvent in vapor form, possibly under high pressure, could work its way through the matrix structure due to its fluidity condition.

A person with knowledge of the art will understand that the removal of the solvent described in this step occurs by the interaction between the discrete particles and the mass of hot gas at high pressure; that is, the mass of hot gas at high pressure transfers an amount of energy or heat to the discrete particles, which in the context of the present invention, allows the removal of the solvent by evaporation.

According to the characteristics of the present invention, by providing a hybrid process for obtaining particles with pore structure, it is necessary to highlight the characteristics and technical advantages that differentiate this invention from the processes described in the state of the art.

In this sense, in the state of the art, pneumatic atomization or two-fluid atomization processes are described to obtain particles with a pore structure, which comprise a process of drying by atomization. The process of drying by atomization comprises the atomization of a solubilized matrix composition, in suspension or in an oil-in-water type emulsion, in the presence of a hot gas or drying at atmospheric pressure. This process is characterized in that the interaction of the discrete particles with a mass of hot gas (drying gas) at atmospheric pressure, allows the rapid evaporation of the solvent and obtaining particles or powders, which can present a structure of pores or cavities. (Anandharamakrishnan, C. (Ed)., *Hand-* book of Drying for Dairy Products, 2017, p. 57-74, John Wiley & Sons). However, obtaining particles with a pore structure by means of said process, start from compositions of solubilized matrices with a high content of solvents (preferably greater than 50% by weight), and more particularly from organic solvents to solubilize matrices not soluble in water; furthermore, a high energy consumption is required for the removal of said solvents, since it demands a high volume of drying air.

Therefore, a person with knowledge of the art will understand that step b) described in the present invention differs from the processes of drying by atomization described in the state of the art, in relation to the following aspects: 1) removal of the solvent, which in the context of the present invention occurs by evaporation, develops from discrete particles that comprise a water-in-oil type emulsion of a non-solubilized and in melt state matrix composition; and where 2) the emulsion comprises an aqueous and/or water-soluble solvent composition, preferably less than 50% by weight. Both characteristic aspects of the present invention present technical advantages in terms of: 1) less use of solvents in the matrix composition; which 2) demands a lower energy consumption for the removal of said solvents; and 3) a higher amount of porous particle production per unit time (since there is preferably a higher matrix content in the feedstock), which reduces processing times.

In a preferred embodiment of the invention, the high temperature and pressure atomization gas is air. However, the present invention does not limit the type of gas used to develop the atomization process. The high pressure atomization gas can be supplied from a pressurization system such as a compressor, where the atomization gas can be heated by an auxiliary device provided with heating resistors, prior to being incorporated into the pneumatic atomization system. Preferably, the atomization gas is fed at a pressure greater than 1 atmosphere (1 atm), and more preferably greater than 4 atmospheres (4 atm). Preferably, the atomization gas is fed at a temperature higher than the boiling point (at atmospheric conditions) of the solvent composition (dispersed phase) of the emulsion; more preferably, the atomizing gas is fed at a temperature at least 1° C. above the boiling point of the solvent composition at atmospheric conditions. In a preferred embodiment of the invention, the atomization gas is used at a pressure from 4 to 6 atmospheres (4 atm-6 atm) and a temperature from 110° C. to 250° C.

Continuing with the description of the general steps of the method of the present invention, the last step is:

3. Cooling the discrete particles obtained in step b), immediately after having removed the solvent composition, by contact with a gas flow cold enough to allow the discrete particles to solidify at a temperature below the point of fluidity of the matrix composition, and preserving the pore structure formed in step b), obtaining discrete particles in solid state, essentially free of solvents, with a pore structure.

Once the solvent removal occurs in step b), the discrete particles formed with pore structure are immediately cooled to a temperature below the point of fluidity of the matrix composition. A rapid cooling of said discrete particles in melt state makes possible to preserve the pore structure formed in step b), obtaining solid state particles, essentially free of solvents, and with a pore structure.

In step c) of the present invention, the cooling and solidification of the discrete particles formed in stage b), occurs by the interaction of the discrete particles with a stream of cooling gas, where the energy or heat contained in said particles is removed.

According to the characteristics of the present invention, by providing a hybrid process for obtaining particles with pore structure, it is necessary to highlight the characteristics and technical advantages that differentiate this invention from the processes described in the state of the art.

In this context, in the state of the art, atomization processes are described to obtain particles with a pore structure, which comprise processes of drying by atomization and freezing (spray freeze-drying). In these processes, the atomization of a feed material (a composition of matrix and solvent) is carried out to form discrete particles; which are subjected to cooling or freezing through interaction with cold gas and/or cryogenic liquid. Subsequently, said frozen solid particles are subjected to a post-treatment process for the removal of the solvent by sublimation, under conditions of low temperature and reduced pressure (vacuum conditions), obtaining microparticles with a structure of pores or cavities (Anandharamakrishnan, C (Ed)., Handbook of Drying for Dairy Products, 2017, p. 123-132, John Wiley & Sons). Obtaining particles with pore structure by means of processes of drying by atomization and freezing is useful for the processing of feed material with a high solvent composition, between 80% and 99% by weight.

Therefore, a person with knowledge of the art will understand that the present invention differs from the processes of drying by atomization and freezing, in relation to the following aspects: 1) the removal of the solvent occurs by evaporation, starting from discrete particles comprising a water-in-oil type emulsion of an non-solubilized matrix and in melt state matrix composition; where 2) the emulsion comprises an aqueous and/or water soluble solvent composition, preferably less than 50% by weight; and where 3) the cooling process of the discrete particles occurs in a subsequent step to the solvent removal process, obtaining directly, dried particles with pore structure.

These characteristic aspects of the present invention present technical advantages, since: 1) it requires less solvents in the composition of the matrix; which 2) demands a lower energy consumption for the removal of said solvents; furthermore, 3) post-treatment processes are not required for the formation of particles with pore structure, reducing processing times.

On the other hand, in the state of the art, atomization processes are described to obtain solid particles from non-solubilized and in melt state matrices, which comprise process of spraying by cooling (spray chilling). Said process is characterized in that an amount of energy or heat is removed from the discrete particle formed, as a result of the interaction of these particles with a stream of cold and/or cryogenic gas at atmospheric pressure, generating the solidification of the particle below its melting point or flow condition. From this process it is known that if the formed discrete particles contain some type of volatile solvent (generally introduced in small ones as a process aid), solvent evaporation can occur due to the removal of heat from the discrete particle. The evaporation of the solvent, through this heat transfer mechanism, can cause the formation of particles with a certain structure of holes or pores. However, the removal of solvent, by means of said mechanism, is limiting for a solvent content greater than 10% by weight, since a flow of cooling gas is required at reduced pressure conditions (vacuum conditions); characteristic that defines a different process, which is referred to the above-described process of drying by atomization and freezing, which also differs from the present invention.

Therefore, a person with knowledge of the art will understand that the present invention differs from the processes of atomization by cooling, in relation to the following aspects: 1) the solvent removal occurs to a greater extent by a mechanism of transfer reverse heat, that is, the solvent is removed by a high pressure hot atomization gas, which transfers an amount of energy or heat to the discrete particles formed in step a) of the present invention; where also 2) said solvent removal process occurs in a prior step to the cooling process of the discrete particles formed.

These characteristic aspects of the present invention have technical advantages, since: 1) it allows to remove a greater quantity of solvent in the composition of the matrix, taking advantage of the resource of atomization gas at high temperature and pressure, without resorting to gas conditions of low temperature and reduced pressure cooling; which 2) demands a lower energy consumption for the removal of said solvents; 3) makes it possible to control the particle pore morphology; in addition, 4) post-treatment processes are not required for the formation of particles with pore structure, reducing processing times.

In a preferred embodiment of the invention, the cooling gas is air. However, the present invention does not limit the type of gas used to develop the cooling process. The cooling gas can be supplied to the atomization process at a temperature below the melting point or flow condition of the matrix composition. Generally, cooling gas at room temperature is sufficient to obtain discrete particles in solid state, which reduces energy consumption and operation by not requiring the use of cryogenic gas. In a preferred embodiment of the invention, when the matrix composition comprises at least one matrix selected from the group comprising waxes, air is used as cooling gas at a temperature from 10° C. to 20° C.

In the present invention, the morphology of pores in the particle in relation to its size, distribution and surface area, can be controlled according to parameters of the matrix composition, such as the weight ratio of matrix:solvent, the ratio in weight of hydrophilic and hydrophobic components that comprise the matrix composition; as well as the operating conditions of the process, such as the pressure and temperature of the atomization gas. For example, FIG. 1, FIG. 2, FIG. 3, FIG. 5 and FIG. 6 correspond to images by SEM microscopy, which demonstrate how the morphology of the particles obtained with the method of the present invention can be controlled depending on the solvent concentration in the emulsion and the weight ratio of hydrophilic and hydrophobic components that make up the matrix composition. Derived from these examples, FIG. 4 shows an X-ray diffraction pattern, used to measure changes in the crystalline structure of the matrix, when it is subjected to thermal processes, which shows that the crystalline structure of the matrix does not it is altered by the thermal processes that describe the present invention. On the other hand, FIG. 7 corresponds to images by SEM microscopy, which demonstrate how the morphology of the particles obtained with the method of the present invention can be controlled depending on the inclusion of a surfactant in the composition of the emulsion.

Having described the present invention in detail, a person skilled in the art will understand that the method developed comprises a hybrid process of atomization via drying-cooling, since it combines particular technical characteristics that separately define the processes of atomization drying and atomization by cooling. By combining both processes in the same method, in a sequential way, it results in a new hybrid process to obtain particles with pore structure from a water-in-oil type emulsion, made up of a non-solubilized and in melt state matrix, which solves the technical needs described in the state of the art. Therefore, a person skilled in the art will be able to see, by looking at the process and the particles obtained, the difference in processability and pore structure with respect to the particles that are produced by other drying processes.

EXAMPLES

Example 1

Preparation of Solid Particles from a Candelilla Wax Matrix Composition with a Water Content of 2% by Weight. (for Reference, not within the Invention).

98 gr of candelilla wax (7833—Candelilla Real® refined, supplied by Multiceras, S. A. de C. V., with a melting range between 69° C. to 73° C.) were heated in a 600 mL container on a grill heating, until reaching a temperature of 90° C. ($T_m$+20° C.). The melting point ($T_m$) of the candelilla wax was determined by Differential Scanning calorimetry (DSC), located around 70° C. Subsequently, the wax in its melt state was transferred to a storage container with a capacity of 300 mL, located in the upper part of a pneumatic atomization system, provided with a heating bath set at 125° C. to keep the wax composition at a temperature of 90° C. The storage container is part of an accessory of the pneumatic two-fluid atomization equipment—Mini Spray Dryer B-290—of the BUCHI brand, which allows operating under the cooling spray mode. The water content in the feed material was adjusted to a value of 2% by weight of the total, for which 2 g of water was added at a flow rate of 5 mL/min in the presence of mechanical stirring, prior to the atomization process. Immediately after adjusting the water content, the feed material was conveyed via a connecting tube to the two-fluid pneumatic atomizer at a temperature of 90° C. An atomizing nozzle with a diameter of 1.4 mm was used.

Air was used as the atomization gas, which was introduced at a pressure of 5 bar, at a flow of 600 L/h and a temperature of 140° C. The atomization gas was previously heated when it was introduced into the atomization tip, by means of a self-made heating accessory, which was adapted to the pneumatic atomization equipment. A cooling gas suction flow of 38 $m^3$/h was used, under a co-current operation, using dry air as cooling gas at a temperature of 13° C.

The maximum residence time of the feed material in the equipment storage container, until the end of the atomization process, was less than 3 minutes.

FIG. 1 shows images by scanning electron microscopy (SEM) of the solid particles obtained. The particles obtained in this example show a solid morphology without the presence of pore structure both on the surface (FIG. 1*a*) and inside the particle (FIG. 1*b*). The atomization of a candelilla wax composition with a water content of 2% by weight does not satisfy the needs described in the state of the art, in relation to obtaining particles with a pore structure.

The size of the particles obtained was from 9.85 microns to 35.13 microns (9.85 μm to 35.13 μm), determined by the Image analysis software (ImageJ), using the images obtained by scanning electron microscopy (SEM). The particles obtained had a density of 0.57 g/$cm^3$ without a pore structure.

Example 2

Preparation of Particles with Pore Structure from a Water-in-Oil Type Emulsion of a Wax Matrix Composition with 12% Solvent.

88 g of candelilla wax (7833—Candelilla Real® refined, provided by Multiceras, S. A. de C. V., with a melting range from 69° C. to 73° C.) were heated in a 600 mL container on a grill heating, until reaching a temperature of 85° C. ($T_m$+15° C.). The melting point ($T_m$) of the candelilla wax was determined by Differential Scanning calorimetry (DSC), located around 70° C. Subsequently, 12 g of water were added at a flow rate of 5 mL/min in the presence of mechanical stirring, to form a water-in-oil type emulsion with a water content (dispersed phase) of 12% by weight. Once the emulsion was formed, it was transferred to a storage container with a capacity of 300 mL, located in the upper part of an atomization system, provided with a heating bath set at 120° C. to maintain the emulsion at a temperature of 85° C. Immediately afterwards, the emulsion was transported through a connection tube to the pneumatic two-fluid atomizer at a temperature of 85° C. The conditions for atomization of the emulsion were the same as those described in Example 1.

The maximum residence time of the feed material in the equipment storage container, until the end of the atomization process, was less than 2 minutes.

Figure 2:
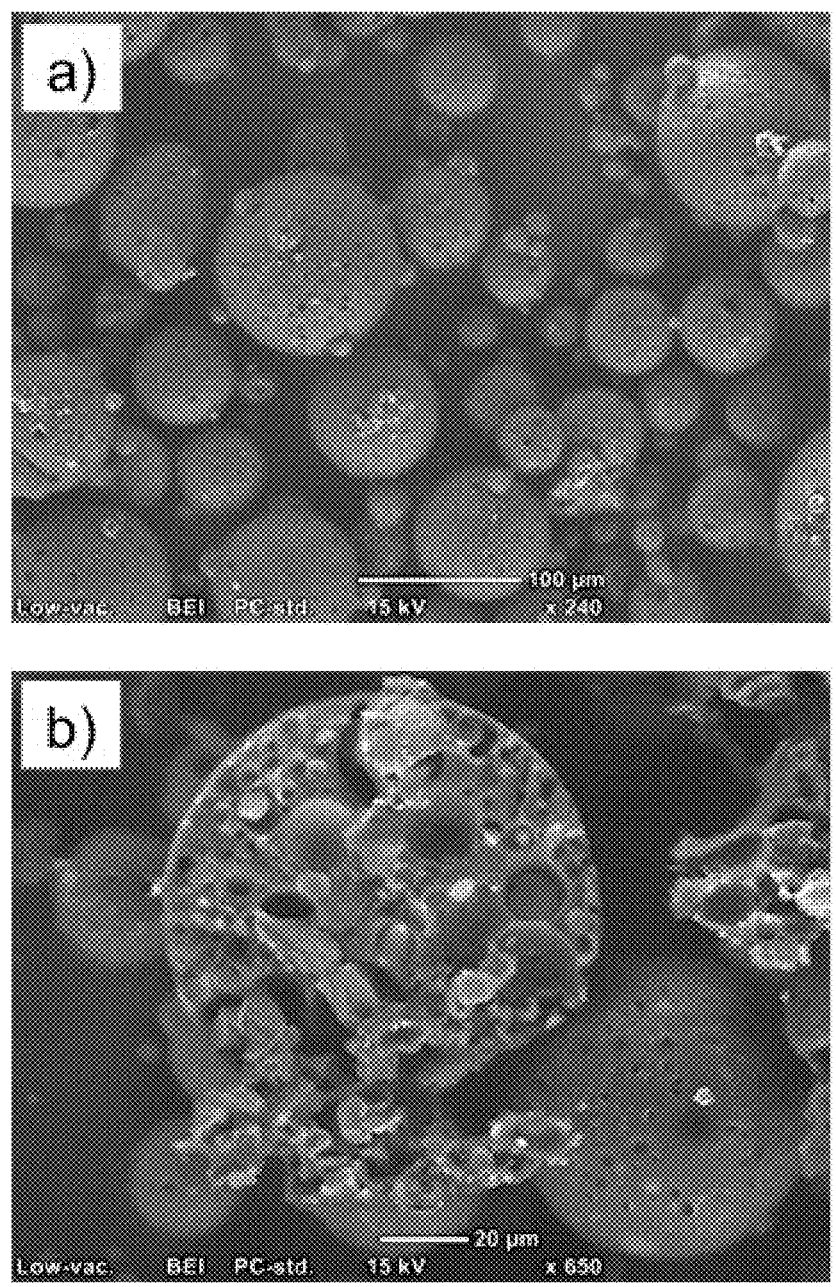
FIG. 2 illustrates scanning electron microscopy (SEM) images of porous particles obtained from a water-in-oil type emulsion, made up of a candelilla wax matrix composition (continuous phase) and a water content (dispersed phase) of 12% by weight.

FIG. 2 shows images by scanning electron microscopy (SEM) of the porous particles obtained. The particles obtained in this example show a spherical shape with a pore structure both at the surface level (FIG. 2a) and inside the particle (FIG. 2b). The atomization of a candelilla wax composition with a water content of 12% by weight, was carried out satisfactorily using the hybrid process of atomization via drying-cooling, which allowed obtaining particles with pore structure, which satisfies the needs described in the state of the art.

The size of the porous particles obtained was between 30.98 microns to 57.12 microns (30.98 µm to 57.12 µm), presenting an average surface pore diameter of 2.04 microns (2.04 µm); which were determined by the image analysis software (ImageJ), using the images obtained by scanning electron microscopy (SEM). The particles obtained had a density of 0.50 g/cm³ with a pore structure, which represents a weight reduction of about 12% in relation to the solid particles obtained from Example 1.

Example 3

Preparation of Particles with Pore Structure from a Water-in-Oil Type Emulsion of a Wax Matrix Composition with 50% Solvent.

A water-in-oil type emulsion of a candelilla wax matrix composition was prepared, with a water content (dispersed phase) of 50% by weight. For which, the same procedure described in Example 2 was followed, using 50 g of candelilla wax and 50 g of water. The maximum residence time of the feed material in the equipment storage container, until the end of the atomization process, was less than 1 minute. The reduction in processing time, in relation to Example 2, is due to the fact that the addition of water improves the processability during the pneumatic atomization process, in addition to achieving the desired effect of particles with pore structure.

Figure 3:
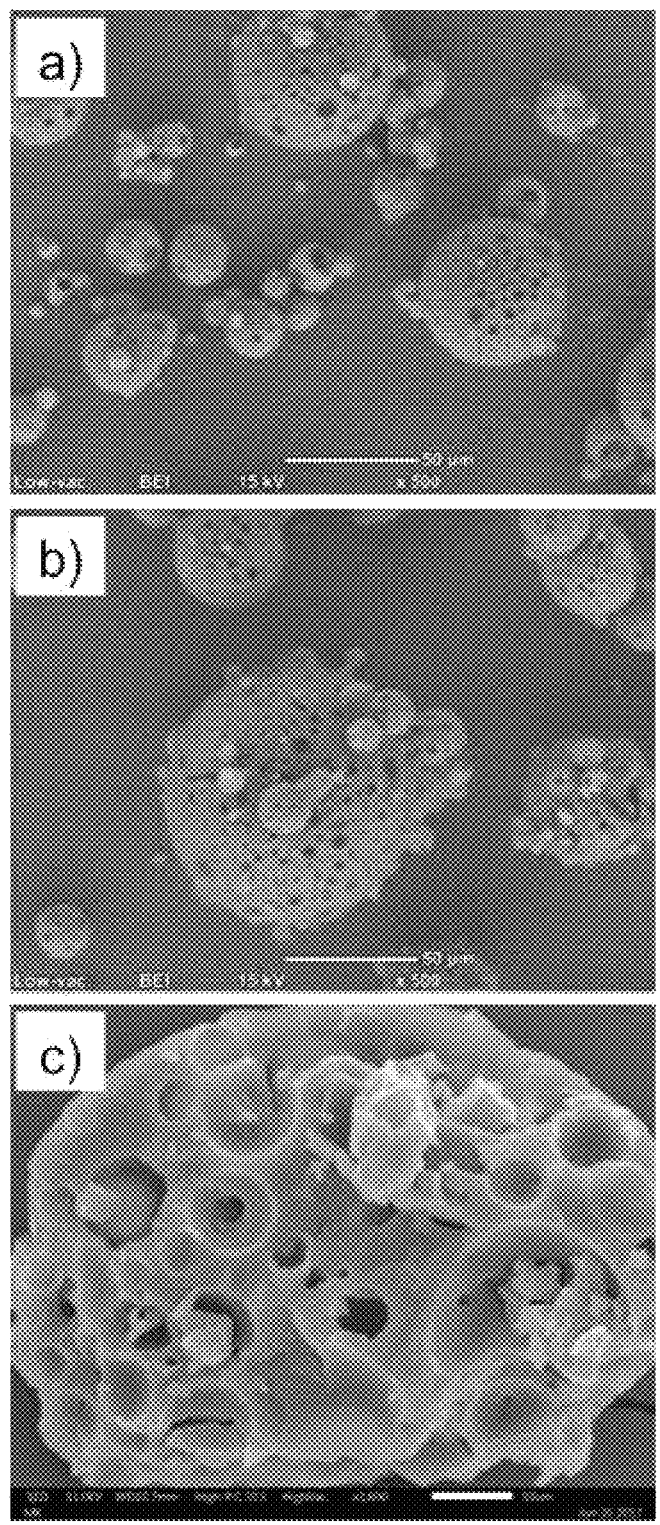
FIG. 3 illustrates scanning electron microscopy (SEM) images of porous particles obtained from a water-in-oil type emulsion, made up of a candelilla wax matrix composition (continuous phase) and a water content (dispersed phase) 50% by weight.
Figure 4:
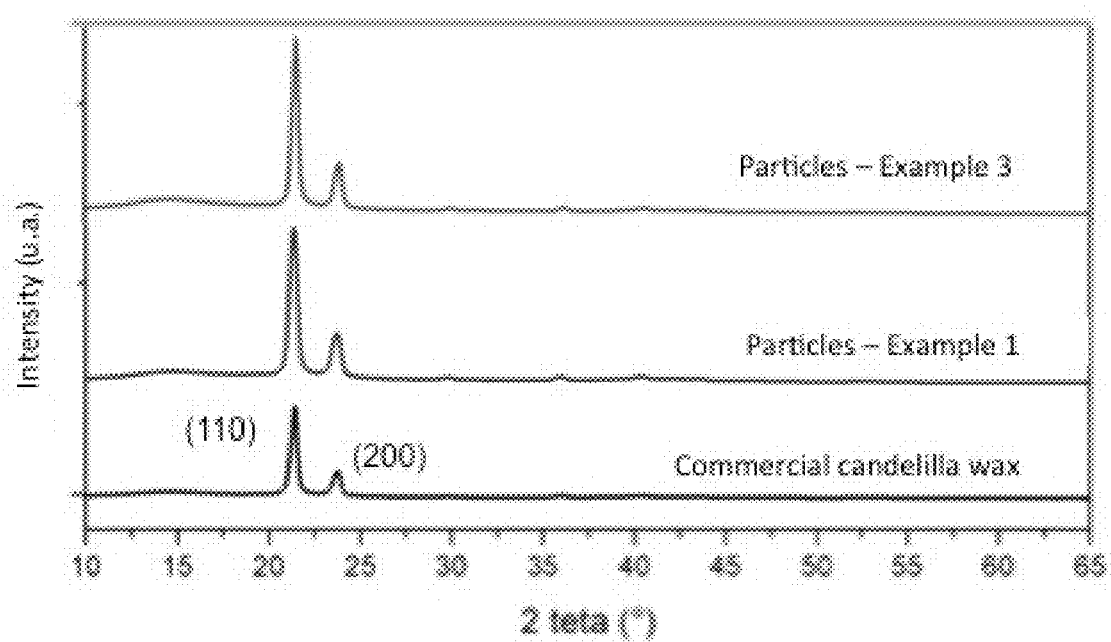
FIG. 4 illustrates X-ray diffraction (XRD) patterns of particles obtained by the method of the present invention.

FIG. 3 shows images by scanning electron microscopy (SEM) of the solid particles obtained. The particles obtained in this example show a spherical shape with a pore structure both at the surface level (FIG. 3a, FIG. 3b) and inside the particle (FIG. 3c). The atomization of a candelilla wax composition with a water content of 50% by weight was carried out in a satisfactory way using the hybrid process of atomization via drying-cooling, which allowed obtaining particles with pore structure, which satisfies the needs described in the state of the art.

The size of the porous particles obtained was between 25.05 microns to 47.5 microns (25.05 µm to 47.5 µm), presenting an average surface pore diameter of 2.24 microns (2.24 µm); which were determined by the image analysis software (ImageJ), using the images obtained by scanning electron microscopy (SEM). The particles obtained had a density of 0.34 g/cm³ with a pore structure, which represents a weight reduction of about 40.35% in relation to the solid particles obtained from Example 1.

FIG. 4 shows the X-ray diffraction (XRD) patterns of the particles obtained from Examples 1 and 3, which are compared with the original candelilla wax matrix (as received from the supplier). Candelilla wax has two characteristic diffraction peaks, corresponding to diffraction planes (110) and (200), which is characteristic of the orthorhombic phase, which represents its most stable crystalline structure. The porous particles obtained with the process of the present invention have the most stable crystalline structure of candelilla wax, which is believed to avoid molecular rearrangement phenomena of the wax components, which compromise the conservation of pore structure during storage.

Example 4

Preparation of solid particles from a carnauba wax matrix composition with a water content of 2% by weight. (For reference, not within the invention).

Solid particles of carnauba wax were prepared in a similar way to the procedure described in Example 1. For this, 98 g of carnauba wax type IV (6004—Carnauba type IV, provided by Multiceras, S. A. de C. V., with a melting range of between 80° C. and 86° C.) were subjected to heating, in a 600 mL container on a heating rack, until reaching a temperature of 90° C. ($T_m$+8° C.). The melting point ($T_m$) of the carnauba wax was determined by differential scanning calorimetry (DSC), located around 82° C. Subsequently, the same procedure described in Example 1 was followed.

Figure 5:
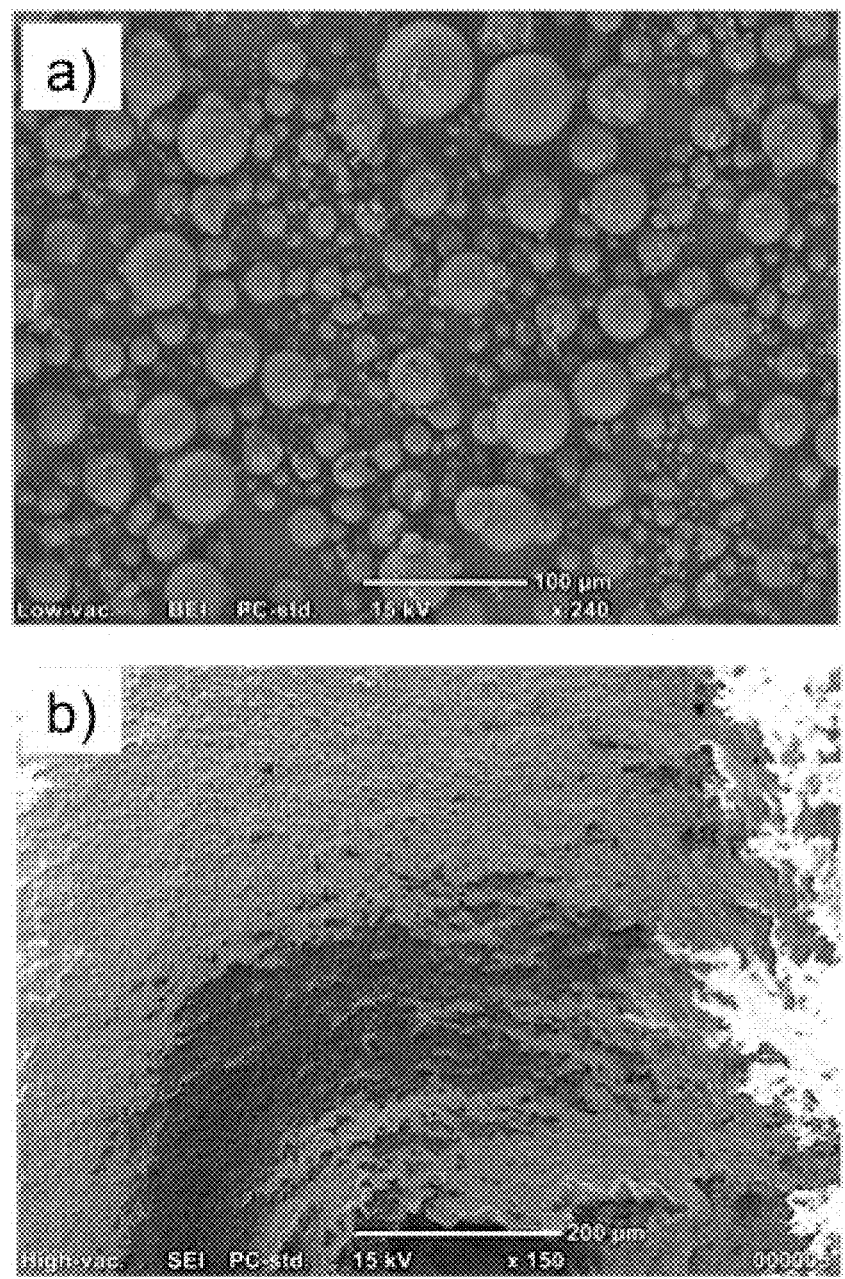
FIG. 5 illustrates scanning electron microscopy (SEM) images of solid particles obtained from a carnauba wax matrix composition with a water content of 2% by weight.

FIG. 5 shows images by scanning electron microscopy (SEM) of the solid particles obtained. The particles obtained in this example show a solid morphology without the presence of pore structure both at the surface level (FIG. 5a) and inside the particle (FIG. 5b). The atomization of a composition of carnauba wax with a water content of 2% by weight does not satisfy the needs described in the state of the art, in relation to obtaining particles with a pore structure.

The size of the particles obtained ranged from 10.81 microns to 24.76 microns (10.81 µm to 24.76 µm), determined by the image analysis software (ImageJ), using the images obtained by scanning electron microscopy (SEM). The particles obtained had a density of 0.61 g/cm³ without a pore structure.

Example 5

Preparation of Particles with Pore Structure from a Water-in-Oil Type Emulsion of a Wax Matrix Composition with 12% Solvent.

A water-in-oil type emulsion of a carnauba wax matrix composition was prepared, with a water content (dispersed phase) of 12% by weight. For this, 88 g of carnauba type IV wax (6004—Carnauba type IV, provided by Multiceras, S. A. de C. V., with a melting interval of between 80° C. to 86° C.) were heated, in a 600 container mL on a heating rack, until reaching a temperature of 90° C. ($T_m$+8° C.). The melting point ($T_m$) of the carnauba wax was determined by differential scanning calorimetry (DSC), located around 82° C. Subsequently, 12 g of water were added at a flow rate of 5 mL/min in the presence of mechanical stirring, to form a water-in-oil type emulsion with a water content (dispersed phase) of 12% by weight.

Once the emulsion was formed, it was transferred to a storage container with a capacity of 300 mL, located in the upper part of an atomization system, provided with a heating bath set at 125° C. to keep the emulsion at a temperature of 90° C. Immediately afterwards, the emulsion was transported through a connection tube to the pneumatic two-fluid atomizer at a temperature of 90° C. The conditions for atomization of the emulsion were the same as those described in Example 1.

The maximum residence time of the feed material in the equipment storage container, until the end of the atomization process, was less than 2 minutes.

Figure 6:
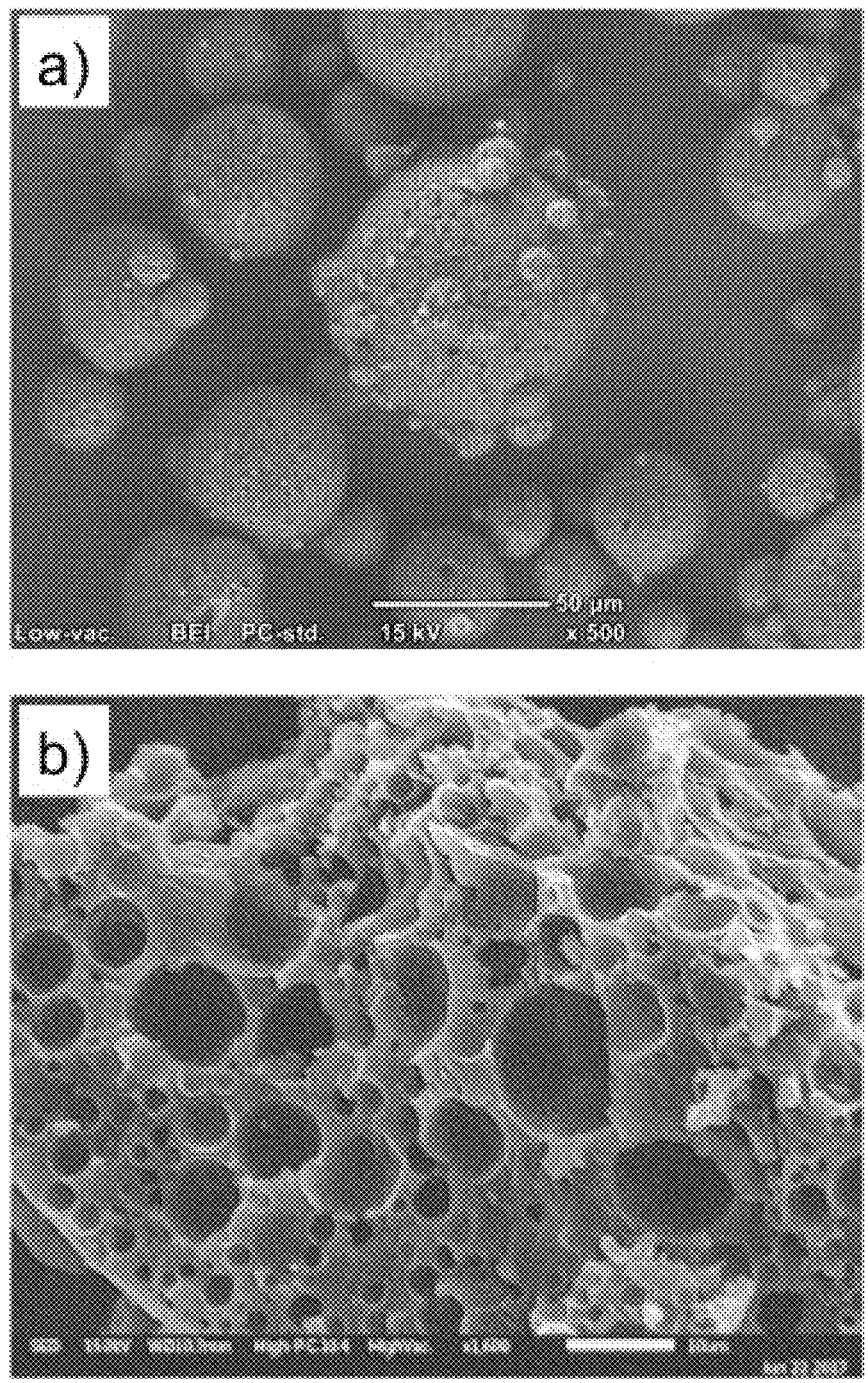
FIG. 6 illustrates scanning electron microscopy (SEM) images of porous particles obtained from a water-in-oil type emulsion, made up of a carnauba wax matrix composition (continuous phase) and a water content (dispersed phase) of 12% by weight.

FIG. 6 shows images by scanning electron microscopy (SEM) of the solid particles obtained. The particles obtained in this example show a spherical shape with a pore structure both at the surface level (FIG. 6a) and inside the particle (FIG. 6b). The atomization of a composition of carnauba wax with a water content of 12% by weight was carried out in a satisfactory way using the hybrid process of atomization via drying-cooling, which allowed obtaining particles with pore structure, which satisfies needs described in the state of the art.

The size of the porous particles obtained ranged from 17.35 microns to 35.83 microns (17.35 µm to 35.83 µm), presenting an average surface pore diameter of 2.01 microns (2.01 µm); which were determined by the image analysis software (ImageJ), using the images obtained by scanning electron microscopy (SEM). The particles obtained with carnauba wax presented a different pore structure than those obtained with candelilla wax (FIG. 2 of Example 2). Therefore, the internal pore structure in the particle can be modified depending on the type and composition of matrix used. The particles obtained had a density of 0.51 g/cm³ with a pore structure, which represents a weight reduction of about 16.39% in relation to the solid particles obtained from Example 1.

Example 6

Preparation of Particles with Pore Structure from a Water-in-Oil Type Emulsion of a Wax Matrix Composition with 1.2% Solvent Containing Surfactant. (Optional Mode of the Invention).

A water-in-oil type emulsion of a candelilla wax matrix composition, with a water content (dispersed phase) of 12% by weight, was prepared using La-phosphatidylcholine (P5638 from Sigma Aldrich) at 5% by weight of the wax content, as an anionic surfactant from the group comprising phosphatidylcholine. For this, 88 g of candelilla wax (7833—Candelilla Real® refined, provided by Multiceras, S. A. de C. V., with a melting range between 69° C. to 73° C.) were heated, in a 600 mL container on a heating rack, until reaching a temperature of 85° C. ($T_m$+15° C.). The melting point ($T_m$) of the candelilla wax was determined by differential scanning calorimetry (DSC), located around 70° C. Later, 4.4 g of L-α-phosphatidylcholine were added as anionic surfactant. Once the surfactant was dissolved in the wax in the molten state, later, 12 g of water were added at a flow rate of 5 mL/min in the presence of mechanical stirring, to form a water-in-oil type emulsion with a content of water (dispersed phase) 12% by weight. Subsequently, the procedure described in Example 2 was followed.

The maximum residence time of the feed material in the equipment storage container, until the end of the atomization process, was less than 2 minutes.

Figure 7:
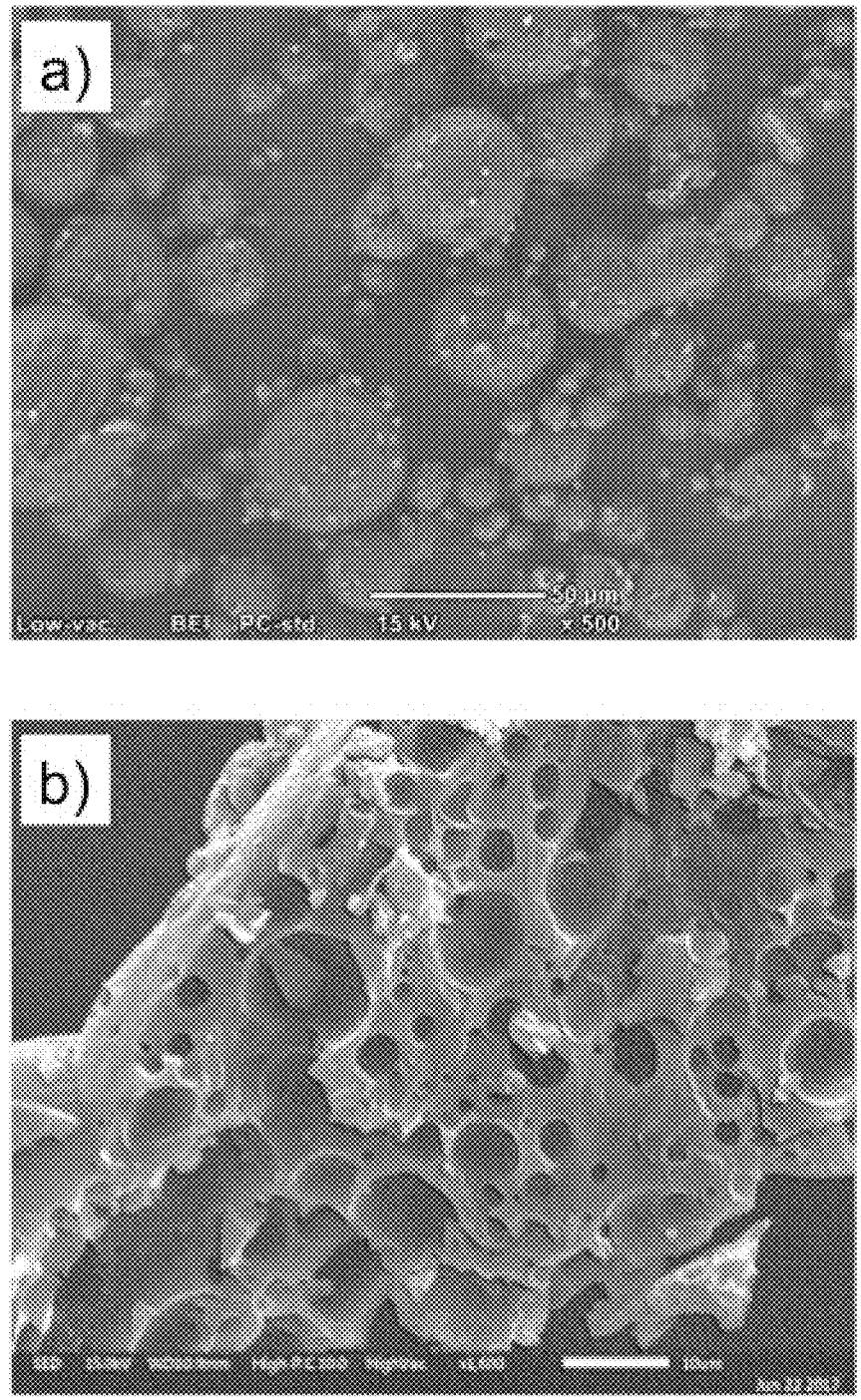
FIG. 7 illustrates scanning electron microscopy (SEM) images of porous particles obtained from a water-in-oil type emulsion, made up of a candelilla wax matrix composition (continuous phase), a water content (dispersed phase) of 12% by weight, and an anionic surfactant at 5% by weight of the content of the wax matrix.

FIG. 7 shows images by scanning electron microscopy (SEM) of the porous particles obtained. The particles obtained in this example show a spherical shape with a pore structure both at the surface level (FIG. 7a) and inside the particle (FIG. 7b). The atomization of a candelilla wax composition with a water content of 12% by weight was carried out in a satisfactory manner using the hybrid spray drying-cooling process, which allowed obtaining particles with a pore structure.

The size of the porous particles obtained ranged from 17.32 microns to 40.31 microns (17.32 µm to 40.31 µm), presenting an average surface pore diameter of 1.02 microns (1.02 µm). In the order of magnitude of microns ($10^{-6}$ m), the number of pores at the surface level and the average pore diameter obtained with this example were much lower than those obtained with the system without surfactant (FIG. 2 of Example 2). On the other hand, the particles obtained in this example had a higher content of internal pores and with a smaller diameter than those obtained with the system without surfactant (Example 2). The measurement of sizes was carried out using the image analysis software (ImageJ), using the images obtained by scanning electron microscopy (SEM). The surface and internal pore structure of the particles can be modified with the addition of a surfactant in the matrix composition.

This written description uses examples to disclose several embodiments of the inventive subject matter, and also to enable one of ordinary skill in the art to practice the embodiments of inventive subject matter, including making and using any devices or systems and performing any incorporated methods. The patentable scope of the inventive subject matter is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A method of obtaining particles with pore structure, by means of a hybrid process of atomization via drying-cooling, which comprises the steps of:
   a) providing a water-in-oil type emulsion, which comprises:
      i. a composition of a non-solubilized and in melt state matrix, in a concentration of up to 90% by weight of the total emulsion, made up of at least one wax and/or fat, where said matrix composition constitutes the continuous phase of the emulsion; and
      ii. an aqueous and/or water-soluble solvent composition, in a concentration of up to 60% by weight of the total emulsion, which optionally may contain a non-aqueous volatile solvent, where said solvent composition constitutes the dispersed phase of the emulsion;
   b) atomizing the emulsion obtained in step a), by means of the steps of:
      i. separating the water-in-oil type emulsion obtained in step a) into discrete particles and;
      ii. removing the solvent composition described in step a) by evaporation, allowing the formation of a pore structure;

wherein the step b) is driven by the action of shear forces induced by an atomization gas flow, which is provided at a pressure of up to 10 atm and a temperature of up to 250° C.; and c) cooling the discrete particles obtained in step b), immediately after having removed the solvent composition, by contact with a gas flow cold enough to allow the discrete particles to solidify at a temperature below the point of fluidity of the matrix composition, and preserving the pore structure formed in step b), obtaining discrete particles in solid state, essentially free of solvents, with a pore structure.

2. The method for obtaining particles with a pore structure of the claim 1, wherein the continuous phase of the emulsion comprises a matrix selected from the group consisting of waxes and/or saturated (fully hydrogenated), partially saturated (partially hydrogenated) and/or, unsaturated (non-hydrogenated) long alkyl chain compounds, derivatives and combinations thereof.

3. The method for obtaining particles with a pore structure of the claim 2, wherein the continuous phase of the emulsion comprises a wax matrix containing fatty acids in its composition.

4. The method for obtaining particles with a pore structure of the claim 3, wherein the continuous phase of the emulsion comprises a matrix of natural wax selected from the group consisting of candelilla wax, carnauba wax, beeswax, sugar cane wax and combinations thereof.

5. The method of obtaining particles with pore structure of the claim 4, wherein the continuous phase of the emulsion comprises a matrix of candelilla wax.

6. The method for obtaining particles with pore structure of the claim 4, wherein the continuous phase of the emulsion comprises a matrix of carnauba wax.

7. The method for obtaining particles with pore structure of claim 1, wherein the continuous phase of the emulsion also comprises a matrix selected from the group consisting of thermoplastic polymers, biodegradable polymers, biopolymers, elastomers and combinations thereof.

8. The method for obtaining particles with pore structure of the claim 1, wherein the matrix composition that constitutes the continuous phase of the emulsion, is in a concentration from 40% to 90% by weight of the total of the emulsion.

9. The method for obtaining particles with pore structure of the claim 8, wherein the matrix composition that constitutes the continuous phase of the emulsion is in a concentration from 50% to 90% by weight of the total of the emulsion.

10. The method for obtaining particles with a pore structure of the claim 1, wherein the aqueous and/or water-soluble solvent is selected from the group consisting of protic polar solvents, aprotic polar solvents and combinations thereof.

11. The method for obtaining particles with a pore structure of the claim 10, wherein the selected solvent is water.

12. The method for obtaining particles with pore structure of the claim 1, wherein the solvent composition that constitutes the dispersed phase of the emulsion is in a concentration from 60% to 10% by weight of the total of the emulsion.

13. The method for obtaining particles with pore structure of the claim 12, wherein the solvent composition that constitutes the dispersed phase of the emulsion is in a concentration from 50% to 10% by weight of the total of the emulsion.

14. The method for obtaining particles with a pore structure of the claim 1, wherein the volatile non-aqueous solvent is selected from the group consisting of organic solvents insoluble in water with a boiling point lower than 150° C.

15. The method for obtaining particles with a pore structure of the claim 1, wherein the water-in-oil type emulsion contains a surfactant composition selected from the group consisting of non-ionic, anionic, cationic, amphoteric surfactants and combinations thereof.

16. The method of obtaining particles with a pore structure of the claim 15, wherein the anionic surfactant is at least one selected from the group consisting of alkyl phosphates.

17. The method for obtaining particles with a pore structure of the claim 16, wherein the alkyl phosphate surfactant is L-α-phosphatidylcholine.

18. The method for obtaining particles with a pore structure of the claim 15, wherein the surfactant is present in a concentration from 0.001% to 20% by weight of the total matrix composition.

19. The method for obtaining particles with a pore structure of the claim 18, wherein the surfactant is present in a concentration from 0.001% to 5% by weight of the total matrix composition.

20. The method for obtaining particles with a pore structure of the claim 15, wherein the selected surfactant is soluble in the continuous phase of the water-in-oil type emulsion.

21. The method for obtaining particles with a pore structure of the claim 1, wherein the atomization gas used in stage b) is at a pressure from 1 to 10 atm.

22. The method for obtaining particles with a pore structure of the claim 21, wherein the atomization gas is at a pressure from 4 to 6 atm.

23. The method for obtaining particles with a pore structure of the claim 1, wherein the atomization gas used in step b) is at a temperature from 110 to 250° C.

24. The method of obtaining particles with pore structure of the claim 23, wherein the atomization gas is at a temperature from 120 to 200° C.

* * * * *